US 10,733,221 B2

(12) United States Patent
Zhang et al.

(10) Patent No.: US 10,733,221 B2
(45) Date of Patent: Aug. 4, 2020

(54) SCALABLE MINING OF TRENDING INSIGHTS FROM TEXT

(71) Applicant: Microsoft Technology Licensing, LLC, Redmond, WA (US)

(72) Inventors: Yongzheng Zhang, San Jose, CA (US); Rui Zhao, Mountain View, CA (US); Chi-Yi Kuan, Fremont, CA (US); Yi Zheng, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1056 days.

(21) Appl. No.: 15/085,714

(22) Filed: Mar. 30, 2016

(65) Prior Publication Data
US 2017/0286531 A1 Oct. 5, 2017

(51) Int. Cl.
*G06F 16/33* (2019.01)
*G06F 16/93* (2019.01)
*G06F 16/35* (2019.01)
*G06F 16/951* (2019.01)

(52) U.S. Cl.
CPC ........ *G06F 16/3346* (2019.01); *G06F 16/353* (2019.01); *G06F 16/93* (2019.01); *G06F 16/951* (2019.01)

(58) Field of Classification Search
CPC .... G06F 16/3346; G06F 16/93; G06F 16/353; G06F 16/951
See application file for complete search history.

(56) References Cited

U.S. PATENT DOCUMENTS

| | | | | |
|---|---|---|---|---|
| 7,085,065 | B2 * | 8/2006 | Silver | G02B 3/14 359/665 |
| 7,188,078 | B2 * | 3/2007 | Arnett | G06F 21/31 705/7.31 |
| 8,775,431 | B2 * | 7/2014 | Jason | G06Q 30/02 707/740 |
| 8,838,599 | B2 * | 9/2014 | Xu | G06F 16/313 707/737 |
| 9,158,850 | B2 * | 10/2015 | Rao | G06F 16/9535 |
| 9,450,771 | B2 * | 9/2016 | Browning | G06F 16/285 |
| 9,760,838 | B1 * | 9/2017 | Danson | G06N 5/04 |
| 9,830,386 | B2 * | 11/2017 | Huang | G06F 16/35 |
| 9,922,032 | B2 * | 3/2018 | Lightner | G06F 16/93 |
| 9,965,462 | B2 * | 5/2018 | Werth | G06F 17/2785 |
| 9,971,764 | B2 * | 5/2018 | Lev-Tov | G10L 15/1822 |
| 10,095,686 | B2 * | 10/2018 | Zhang | G06F 16/3344 |
| 10,298,655 | B2 * | 5/2019 | Ball | H04L 51/12 |
| 2008/0154883 | A1 * | 6/2008 | Chowdhury | G06F 3/0482 |
| 2012/0047219 | A1 * | 2/2012 | Feng | G06Q 30/02 709/207 |

(Continued)

*Primary Examiner* — Robert W Beausoliel, Jr.
*Assistant Examiner* — Susan F Rayyan
(74) *Attorney, Agent, or Firm* — Hickman Palermo Becker Bingham LLP; Daniel D. Ledesma

(57) ABSTRACT

A system and method for identifying trending topics in a document corpus are provided. First, multiple topics are identified, some of which topics may be filtered or removed based on co-occurrence. Then, for each remaining topic, a frequency of the topic in the document corpus is determined, one or more frequencies of the topic in one or more other document corpora are determined, a trending score of the topic is generated based on the determined frequencies. Lastly, the remaining topics are ranked based on the generated trending scores.

20 Claims, 3 Drawing Sheets

(56) References Cited

U.S. PATENT DOCUMENTS

| | | | |
|---|---|---|---|
| 2012/0131139 A1* | 5/2012 | Siripurapu | G06F 16/951 709/217 |
| 2012/0296920 A1* | 11/2012 | Sahni | H04L 67/22 707/749 |
| 2012/0323908 A1* | 12/2012 | Herbert, Jr. | G06F 16/951 707/728 |
| 2013/0073336 A1* | 3/2013 | Heath | G06Q 30/02 705/7.29 |
| 2013/0339354 A1* | 12/2013 | Jain | G06F 16/951 707/737 |
| 2014/0058722 A1* | 2/2014 | Sun | G06F 17/2735 704/9 |
| 2014/0108393 A1* | 4/2014 | Angwin | G06Q 50/01 707/731 |
| 2014/0172837 A1* | 6/2014 | Sommer | G06Q 50/01 707/722 |
| 2014/0283048 A1* | 9/2014 | Howes | G06F 16/35 726/23 |
| 2014/0358885 A1* | 12/2014 | Zhou | G06Q 10/101 707/708 |
| 2015/0149539 A1* | 5/2015 | Shukla | H04L 67/22 709/204 |
| 2015/0160793 A1* | 6/2015 | Plesur | G06F 3/0482 715/753 |
| 2015/0169587 A1* | 6/2015 | Silverman | G06F 16/24578 707/751 |
| 2015/0193482 A1* | 7/2015 | Kaushansky | G06F 16/35 707/741 |
| 2015/0213022 A1* | 7/2015 | Agarwal | G06F 16/24578 707/731 |
| 2015/0248480 A1* | 9/2015 | Miller | G06F 16/951 707/723 |
| 2015/0356571 A1* | 12/2015 | Chang | G06Q 30/0201 705/7.29 |
| 2016/0103824 A1* | 4/2016 | Zupancic | G06F 17/274 |
| 2016/0188729 A1* | 6/2016 | Ardhanari | G06F 16/9535 707/727 |
| 2016/0224675 A1* | 8/2016 | Li | H04L 67/306 |
| 2016/0292219 A1* | 10/2016 | Prabhakar | G06F 16/35 |
| 2017/0011112 A1* | 1/2017 | Jing | G06F 16/285 |
| 2017/0075978 A1* | 3/2017 | Zhang | G06F 40/216 |
| 2017/0078237 A1* | 3/2017 | Roy | G06F 16/951 |
| 2017/0083628 A1* | 3/2017 | Frenkel | G06Q 50/01 |
| 2017/0262447 A1* | 9/2017 | Paulsen | H04L 67/00 |
| 2017/0270180 A1* | 9/2017 | State | G06F 17/241 |
| 2017/0286531 A1* | 10/2017 | Zhang | G06F 16/3346 |
| 2018/0149380 A1* | 5/2018 | Avedon | F24F 7/007 |

* cited by examiner

SCALABLE MINING OF TRENDING INSIGHTS FROM TEXT

TECHNICAL FIELD

The present disclosure relates to identifying topics in a document corpus and, more particularly to, identifying trending topics in a scalable manner.

BACKGROUND

Trending insights is a computational study of finding significant topics that best represent the insights in a text corpus. An effective approach to identifying trending insights may reveal: (1) trending discussions on specific topics in online forums, such as around a particular brand, product, or service; (2) early signals on what topics might go viral in social media; and (3) emerging sentiment and drivers. A challenge to identifying trending insights comes in the form of the tremendous amount of unstructured data in the form of text that is available online. The data originates from multiple channels, such as product reviews, market research, customer care conversations, and social media. While it is clear that text contains valuable information, it is often less clear on how to best analyze such data at scale. Another challenge is the complex nature of many written languages (including English), which makes it difficult to find the most important topics efficiently.

Some approaches to identifying trending insights are mostly statistical, ranging from simply counting the frequency of words to more advanced methods, such as Latent Dirichlet Allocation (LDA). However, these approaches suffer from a few key issues: (1) too much noise or false positives (e.g., too generic phrases such as "thanks" and "contact us" or frequently appearing words such as "breaking news") are generated; (2) a significant amount of duplication; (3) a significant computational cost; and (4) the results are not intuitive to interpret.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for identifying trending topics in a text corpus. In one approach, a topic identification technique is used to identify multiple topics in a text corpus that comprises multiple documents. Duplicate topics are identified and removed. A trending score is generated for each topic in a subset of the identified topics. The trending scores are used to rank the topics in the subset.

Process Overview

Figure 1:
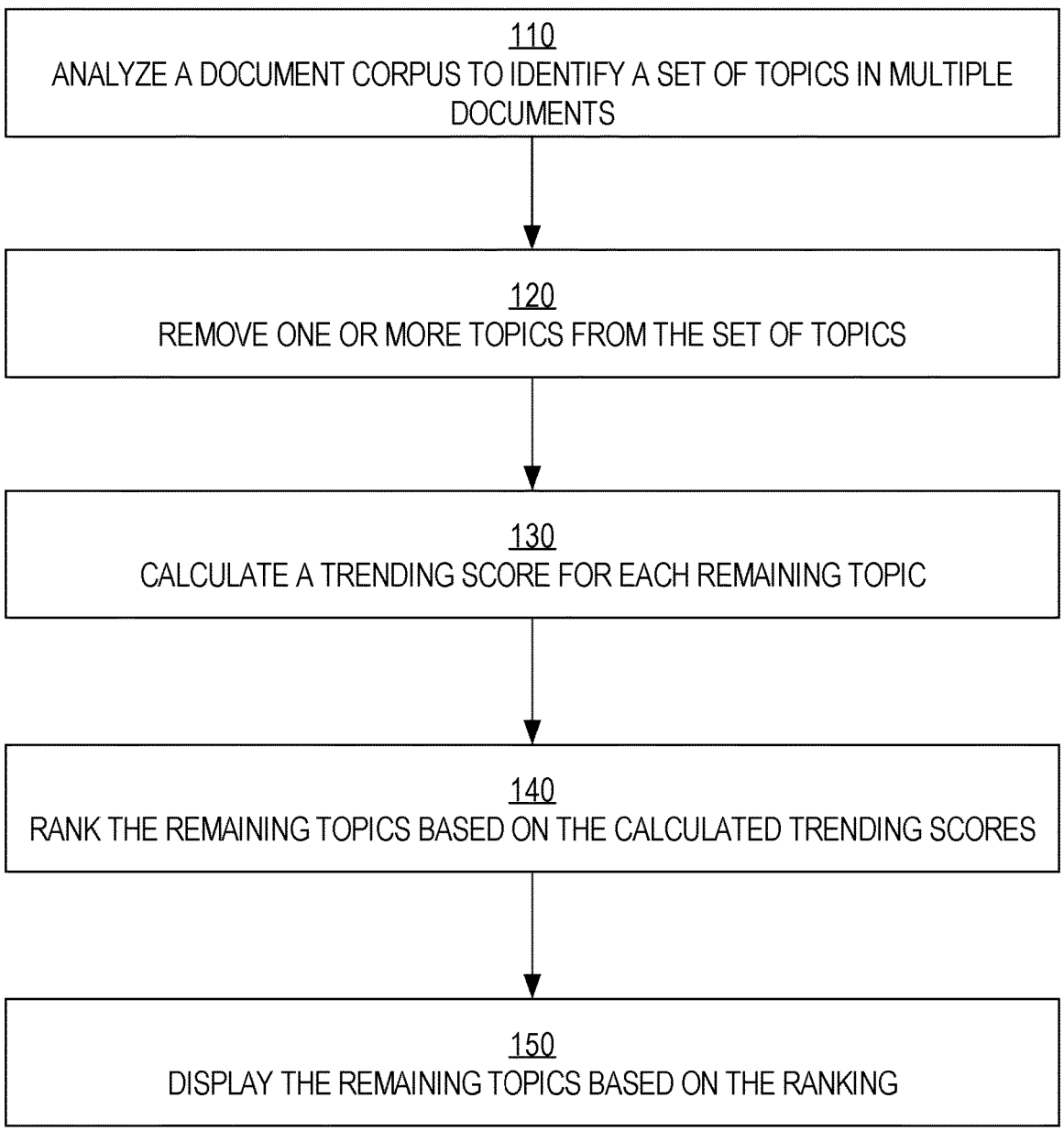
FIG. 1 is a flow diagram that depicts a process for identifying trending topics in a text corpus, in an embodiment.

FIG. 1 is a flow diagram that depicts a process 100 for identifying trending topics in a text corpus, in an embodiment.

At block 110, a document corpus is analyzed to identify a set of topics in multiple documents. One or more topic identification techniques may be used to identify the set of topics.

At block 120, one or more topics in the set of topics are removed. Removing a topic may be based on one or more criteria, such as known, pre-defined, or anticipated topics that a user desires not to surface. A pre-defined topic may be specified by a user and compared to each topic in the set. As another example, removing a topic may involve comparing document locations of two topics in the set of topics. If two topics appear in the same document location in a particular document, then the two topics may be merged or one of the two topics dropped. In an embodiment, block 120 is optional.

At block 130, a trending score is calculated for each topic in the remaining set of topics. A trending score may be calculated in one of multiple ways. For example, a frequency of a topic in each time period of multiple time periods is determined and used to calculate the trending score. The frequency of a topic in a current time period may be compared with the frequency of the topic in one or more previous time periods.

At block 140, the remaining set of topics is ranked based on the calculated trending scores. In one implementation, the higher the trending score, the higher the ranking.

At block 150, the remaining set of topics (or a portion thereof) are displayed based on the ranking. Block 150 may involve only displaying topics whose trending scores are above a certain threshold.

System Overview

Figure 2:
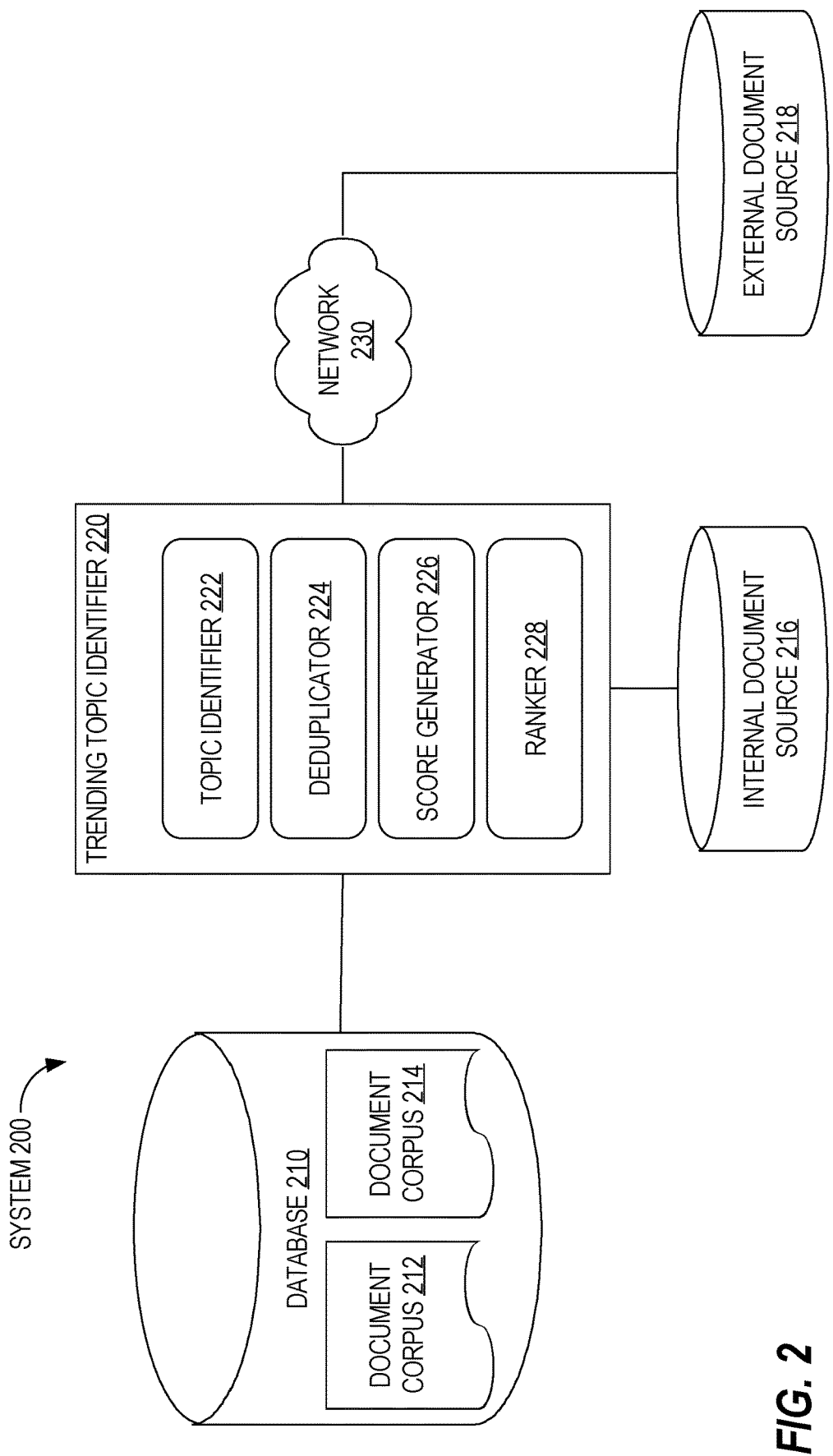
FIG. 2 is a block diagram that depicts a system for identifying trending topics in a document corpus, in an embodiment.

FIG. 2 is a block diagram that depicts a system 200 for identifying trending topics in a document corpus, in an embodiment. System 200 includes a database 210 and a trending topic identifier 220, which includes a topic identifier 222, a deduplicator 224, a score generator 226, and a ranker 228. Each of elements 222-228 may be implemented in software, firmware, hardware, or any combination thereof. Elements 222-228 may be implemented on the same computing device or on any number of different computing devices. In some implementations, system 200 includes multiple instances of one or more of elements 222-228, such as multiple instances of topic identifier 222 and multiple instances of deduplicator 224. While elements 222-228 are depicted as separate elements, elements 222-228 may be implemented as a single component (whether software, firmware or hardware).

Database 210 may comprise a single storage device or multiple storage devices that are local relative to each other or may be remote relative to each other. Database 210 is communicatively coupled to trending topic identifier 220. Database 210 comprises multiple document corpora 212 and 214. While only two document corpora are depicted, database 210 may comprise many document corpora, each corresponding to a different time period, such as a particular month, a particular week, a particular day, a particular set of weeks or days, or a particular hour.

Each document corpus comprises multiple documents from which topics are identified. Documents of a document corpus may be stored in a file system or database (such as a relational or object-relational database). The documents in a document corpus may be of the same type or different types. Example types of documents include news articles, online postings (e.g., Facebook or LinkedIn postings), comments (e.g., on blog postings, pictures, etc.), tweets, and customer care "tickets". Thus, some documents may be a single sentence or phrase while other documents may be many sentences.

The documents in each document corpus may come from a single source or from multiple sources, such as LinkedIn, Facebook, and any third-party publisher. Example sources in FIG. 1 include internal document source 216 (which is part of system 200) and external document source 218, which is not part of system 200 and is accessible through network 230. For example, internal document source 216 may include comments that members of a social network have provided to different blog postings submitted by other members of the social network (e.g., provided by LinkedIn) while external document source 216 may include postings from a third-party service (e.g., Twitter).

Documents from document sources 216 and 218 may be processed prior to analyzing for topics. For example, content from some documents may be filtered out and/or entire documents may be filtered out altogether. Such filtering may be based on whether the documents contain certain subject matter or certain terms (e.g., profanity, pornography, politics) and/or whether the documents do not contain certain subject matter or certain terms (e.g., science-related terms or car-related terms).

Network 230 may be implemented on any medium or mechanism that provides for the exchange of data between trending topic identifier 220 and external document source 218. Examples of network 230 include, without limitation, a network such as a Local Area Network (LAN), Wide Area Network (WAN), Ethernet or the Internet, or one or more terrestrial, satellite or wireless links.

The text within each document may be structured (e.g., using HTML, XML or another standard), unstructured, or partially structured. Thus, some documents in database 210 may be structured and others may be unstructured.

Each document is associated with a timestamp that indicates a season, a year, a month, a day of the week, a specific date, a date range, an hour of the day, an hour range, a minute, and/or a second, and/or any other date or time indication, whether absolute or relative. A timestamp of a document may indicate when the document was created, published, selected a certain number of times by online users, or received by system 200. A document's timestamp may be used (e.g., by trending topic identifier 220) to organize the document with other documents that have the same or similar timestamps or have timestamps that fall within the same pre-defined time period (e.g., a particular week in a particular year).

A document may be associated with multiple timestamps. For example, one timestamp may indicate when the document was published or posted and available online while another timestamp may indicate when the system 200 received the document.

In an embodiment, document corpora 212 and 214 are not fixed in that the number and/or types of documents in each document corpus may change. For example, document corpus 212 may correspond to documents created or posted online during weeks 1-3 and document corpus 214 may correspond to documents created or posted online during weeks 4-6. Trending topics may be identified based on document corpora 212 and 214. Later, document corpus 212 is decomposed (whether physically or logically) to create three document corpora: one for each of weeks 1-3. Thereafter, trending topics are identified based on the three document corpora (and, optionally documents from document corpus 214).

Topic Identification

Topic identifier 222 analyzes text within documents of document corpus 212 (and 214) to identify topics therein. Any technique for identifying topics in a text corpus may be used. An example technique is described in U.S. patent application Ser. No. 14/266,633 filed on Apr. 30, 2014, which application is incorporated by reference as is fully disclosed herein. Another example topic identifying technique is Latent Dirichlet Allocation (LDA).

In an embodiment, each topic comprises a key lexical item (e.g., a word or phrase) and a list of zero or more lexical items. An example of a key lexical item is a person's name (e.g., "John Smith") and examples of associated lexical items include "started company XYZ," "CEO," "philanthropist," and "software development." Thus, John Smith is associated with each of these lexical items and, together, these lexical items comprise a topic. Other example topics include {content marketing, thought leaders, how to, follow}, {Linkedin, new ad targeting feature, release, focus on employees}, and {Linkedin CEO, Jeff Weiner, 14M Stock Grant, passing, employees}, where the first lexical item in each topic is the key lexical item.

In a related embodiment, each topic comprises a list of one or more lexical items, without a notion of a keyword, as in LDA. Each lexical item in the list may be associated with a weight, as in LDA. An example of a topic is {Google 0.73, AlphaGo 0.9, Go 0.83, Lee 0.7, best of five 0.4}.

In an embodiment, each topic is associated with a set of document identifiers, each document identifier identifying a document where the corresponding topic is found. Some topics may be found in only a few documents (e.g., 1) while other topics may be found in many documents. Some documents may contain a single topic while other documents may contain many topics.

In an embodiment, at least one identified topic is associated with specific location within a document. Thus, a topic may be associated with a section identifier that identifies a section within a document. The section identifier may identify a paragraph (e.g., paragraph 3), a sentence (e.g., sentence 4), an offset within a document (e.g., 25 bytes or 35 characters), a range of bytes, characters, or words (e.g., words 5-14), or any combination thereof. Document identifiers and section identifiers of pairs of topics may be used to combine or remove topics, as described in more detail later.

Top N Topics

In some scenarios, hundreds, thousands, or even hundreds of thousands of topics may be identified using a topic identification technique referenced herein. Sophisticated filtering of those topics and calculating a trending score for each topic would take an inordinate amount of time. Therefore, in an embodiment, the top N topics are selected from the set of topics that are identified (using a topic identification technique). Such a subset of topics is selected based on one or more criteria, such as the document frequency of each topic in the subset. For example, if the topic "plane crash" appears in the most documents relative to all other identified topics in the set, then "plane crash" is selected. The frequency with which a topic is mentioned in a single document may be taken into account (in which case topic frequency is measured) or may be ignored, in which case document frequency is measured.

Depending on the topic identification technique that is used, different approaches may be used to determine whether two topics are the same. For example, if the topic identification technique described in U.S. patent application Ser. No. 14/266,633 where topics comprise a key lexical item and a list of associated lexical items, then two topics are the same if the corresponding key lexical items are the same or identical. Additionally or alternatively, two topics are the same if the two corresponding lists of associated lexical items have significant "overlap". Overlap refers to the extent to which two lists of associated lexical items have lexical items in common. For example, if list A has words w1, w2, w3, and w4 and list B has words w2, w3, w4, w5, and w6, then the corresponding topics may be considered the same topic (i.e., because there are three lexical items in common). (In this example, the corresponding topics may be considered the same topic only if the corresponding key lexical items are identical.) "Significant overlap" may be defined with one or more thresholds, such as (a) if two lists have a certain number of lexical items in common or (b) if two lists have a certain percentage of lexical items in common, then the corresponding topics are the same. For example, if 50% of the lexical items in topic A's list are found in topic B's list (and, optionally, vice versa), then topic A and topic B are considered the same topic.

As another example, if LDA is used as a topic identification technique where topics comprise a list of lexical items, then two topics are the same if the corresponding list of lexical items have "significant overlap," which may be defined similarly as above.

N (as in "top N topics") can be any number, such as 100, 500, or 1,000. N may be a tunable number that can change manually or automatically. For example, a user or administrator of system 200 specifies "5000".

As another example, topic identifier 222 (or another component of system 200) determines whether a certain number of topics are identified at different stages in the identifying trending topics process. In this example, system 200 may determine that N should be increased if more than a certain number of identified topics (or certain percentage of identified topics) are deduplicated after the deduplication step. Additionally or alternatively, system 200 may determine that N should be increased if there is less than a certain number of trending topics (or a certain percentage of trending topics) with trending scores that are less than a particular number.

Deduplication

Once the top N topics are identified, some of the topics may be related. For example, the topic "lawsuit" may appear with other topics, such as "user emails", "money", "spam" "pay $13m to settle", and "annoyed users", all of which may be about the same subject: a pending lawsuit pertaining to user emails. If these topics are truly related, then each of these topics will appear together and with roughly equal frequency in a document corpus.

In an embodiment, deduplicator 224 performs deduplication on the top N topics. Deduplication involves determining whether a pair of topics co-occur in the same document location. A document location may be defined at the document level, a paragraph level, a section level, or a sentence level. For example, if two topics appear in the same sentence, then the two topics are considered to co-occur, at least with respect to those instances of the two topics. But if the two topics appear in the same document, the same section within a document, or the same paragraph within a document, then the two topics may not be considered to co-occur.

Co-occurrence may be determined using document identifiers and/or section identifiers associated with each topic in a pair of topics. For example, given two topics where each topic is associated with a different set of document identifiers and section identifiers, common document identifiers in the two sets of document identifiers are identified. Then, for each common document identifier, if corresponding section identifiers (one from each topic and corresponding to the appropriate document) are identical or are a near match, then the two topics are considered to co-occur, at least with respect to that identified section in the identified document.

Co-occurrence may defined in many different ways, such as appearing together (e.g., in the same sentence) for a certain percentage of the time or appearing together for a certain number of times (referred to herein as a "deduplication threshold"). For example, two topics are considered to co-occur if the two topics appear in the same document location (e.g., sentence) at least 50% of all instances of each topic in the document corpus. As a specific example, topic A may appear with topic B (e.g., in the same sentence) 70% of the time that topic B occurs. However, topic B may appear with topic A only 5% of the time topic A occurs. In this specific example, topics A and B might not be considered duplicates and will be treated separately. As another specific example, topic A may appear with topic B (e.g., in the same sentence) over a hundred times. In this specific example, topics A and B might be considered duplicates and will be treated together.

Additionally, co-occurrence may be defined as occurring a roughly equal number of times overall in a document corpus, such as within 30% of each other or within three hundred times of each other (e.g., topic A appears 453 times in document corpus 212 and topic B appears 697 times in document corpus 212, which is within three hundred times of each other).

Similar to N described previously, a deduplication threshold or thresholds that are used to determine whether two topics co-occur may be adjusted manually or automatically. For example, if there are less than M topics with trending scores less than S, then a deduplication threshold is decreased, for example, by 10% or by an absolute amount.

If two topics are considered to co-occur, then the two topics are "combined." "Combining" two topics may involve adding (e.g., all or some) lexical items associated with one topic to a list of lexical items associated with the other topic. Alternatively, one of the topics is dropped or removed from consideration altogether. Either type of combining may or may not result in a change of frequency of the combined topic. For example, topic A has a document frequency of 78 and topic B has a document frequency of 69. If topic B is combined with topic A (due to co-occurrence of topic B with topic A), then the document frequency of topic B may be ignored or the document frequency of topic A is increased by an amount that is based on topic B's document frequency.

If there are N topics that are considered for deduplication, then deduplication may involve approximately $N^2$ co-occurrence determinations: (N−1) for considering topic 1 relative to each of topics 2 to N, (N−2) for considering topic 2 relative to each of topics 3 to N, . . . , (N−(N−1)) for considering topic N−1 relative to topic N.

Trending Scores

In an embodiment, score generator 226 generates a trending score for each topic in a set of topics. The set of topics may include all the topics after the deduplication step is performed or may be limited to the top M topics after the deduplication step is performed. M may be specified manually or may be determined automatically. For example, if the number of trending topics with scores over a certain threshold (T) is less than a particular number (P), then M may be increased, such as a lock step increase or an amount that is based on the difference between T and P. The larger the difference, the more M is increased.

A trending score for a topic is generated based on (1) a frequency with which the topic appears in one document corpus (e.g., document corpus 212) and (2) a frequency with which the topic appears in one or more other document corpora (e.g., document corpus 214) that is associated with a different period of time than the period of time associated with the first document corpus. A difference between the two frequencies may then be divided by one of the frequencies, such as the frequency corresponding to a previous time period. For example, if a previous document frequency of topic A is 19 and a current document frequency of topic A is 57, then a trending score may be calculated as follows: (57−19)/19=3.

Example time periods include a specific month, a specific week, a specific day, a specific hour, and a specific minute. For example, one document corpus is associated with Mar. 31, 2016 and another document corpus is associated with Mar. 30, 2016. As another example, document corpus 212 is associated with week of Mar. 13, 2016 and document corpus 214 is associated with the week of Mar. 20, 2016.

In an embodiment, the size of a document corpus is a factor in generating a trending score of a topic identified in that document corpus. For example, if document corpus 212 is larger than document corpus 214, then a frequency of a particular topic in document corpus 212 may be weighted higher than a frequency of the particular topic in document corpus 214. For example, if a previous document frequency of topic A is 19 and a current document frequency of topic A is 57, but the size of the current document corpus is twice as large as the previous document corpus, then a trending score may be calculated as follows: ((57*2)−19)/19=5.

In a related embodiment, multiple document corpora associated with time periods that are previous to a current time period associated with a document corpus (e.g., document corpus 214) are taken into account when generating a trending score. For example, not only is the current week of documents considered, but also two prior weeks of documents are considered. Document frequencies for topics identified in the prior two weeks worth of documents may have been calculated separately (e.g., topic A identified 13 times in week 1 and topic A identified 52 times in week 2) or may have been calculated once (e.g., topic A identified 65 times in documents from weeks 1 and 2).

One example implementation involves averaging the last 4 weeks (e.g., weeks 1-4) of document frequencies of a particular topic and subtracting that average from a document frequency of the particular topic in the current week (e.g., week 5). For example, topic A appeared 1,243 times in week 1, 1,378 times in week 2, 2,455 times in week 3, 2,139 times in week 4, and 5,679 times in week 5 (the current week). Therefore, a trending score for topic A under this example implementation would be [5,679−(1,243+1,378+2,455+2,140)/4]/(1,243+1,378+2,455+2,139)/4=(5,679−1,804)/1,804~2.15.

Alternatively, the median value in a set of document frequencies of a particular topic (over multiple previous time periods) is selected and subtracted from the current week's document frequency. Alternatively still, a weight is applied to one or more of previous weeks' document frequencies before an average or a median is determined. The weights for the different previous weeks' document frequencies may vary depending on the temporal distance of those weeks to the current week. For example, 0.7 is applied to (e.g., multiplied by) week 1's document frequency (of a particular topic), 0.8 is applied to week 2's document frequency, 0.9 is applied to week 3's document frequency, and no weight is applied to week 4's document frequency and the resulting values are averaged. The average is subtracted from a current document frequency and the difference is divided by the average.

Smoother

In some situations, a topic that is relatively frequent in a current time period may be infrequent or non-existent in prior time periods. Thus, if a trending score is calculating by dividing by a value that is based on one or more previous document frequencies, then the resulting trending score may be very large (if the value is relatively small) or non-real (if the value is 0). For example, there are many topics that never (or rarely) appear before but have medium volume for the current time period. Their respective normalized deltas will dominate the trending score, unless an additional factor is considered.

Therefore, in an embodiment, a trending score is calculated based on a "smoother," which is a number that, not only avoids division by zero (where there is no detection of a topic in a previous time period), but also reduces the sensibility of normalized differences. The following is an example formula where $w_i$ refers to document frequency of a topic in week i:

$$[(w5-\text{avg}(w1+w2+w3+w4)+\text{smoother}]/[\text{avg}(w1+w2+w3+w4)+\text{smoother}]$$

In an embodiment, the exact value of the smoother varies depending on the value of the denominator without the smoother. For example, if the average of the last four weeks of data is less than 100, then the smoother is 100; if that number is between 100 and 500, then the smoother is 200; and if that number is more than 500, then the smoother is 500.

In an embodiment, instead of or in addition to using a smoother, a change in differences from time period to time period is determined and used to generate a trending score for a topic. For example, a difference (d1) is calculated between week 1 (w1) and week 2 (w2), a difference (d2) is calculated between w2 and w3, a difference (d3) is calculated between w3 and w4, a difference (d4) is calculated between w4 and w5 (the current week). If d4 is significantly different (e.g., 2×) than d1, d2, and/or d3, then the corresponding topic may be considered a trending topic and may be assigned a trending score that is based on the difference between d4 and one or more other of the differences.

Ranking

In an embodiment, the generated trending scores are used to rank a set of topics. The higher the trending score, the higher the set of topic is ranked in a list of topics.

In an embodiment, a ranked set of topics is displayed on a screen of a computing device (e.g., a laptop computer, a tablet computer, a desktop computer, or a smartphone) automatically without requiring user input to explicitly request such a display or in response to user input. The user input may have been to request the set of topics to be generated or may have been to request the ranked set of topics to be displayed, after the ranked set of topics was determined.

In an embodiment, the ranked set of topics is generated continuously. User input may be received that specifics how often a ranked set of topics is to be computed, such as weekly, daily, hourly, or some other time period. Alternatively, the periodicity of the generation of a ranked set is hard-coded or pre-defined, such as in a configuration file that is separate from the component(s)/element(s) (whether implemented in hardware, software, or firmware) that are involved in generating the ranked set of topics.

Limiting the Scope of Topic Analysis

In an embodiment, a user provides input that limits the scope of documents that trending topic identifier 220 analyzes using techniques described herein. For example, a user specifies subject matter or one or more terms that a document must contain in order to be analyzed for identifying, scoring, and ranking topics. As another example, the input indicates a type of document or a type of document source from which topics are to be identified, scored, and ranked. As a specific example, an administrator of system 200 may specify customer care tickets as a type of document. In response topic identifier 222 analyzes one or more document corpora of only customer care tickets that have been created or processed over one or more time periods. As another specific example, a user provides input that indicates all external document sources. In response, topic identifier 222 analyzes only documents from external sources (e.g., external document source 218). In this way, trending topics may be identified on a more fine-grained basis.

Feedback

In an embodiment, one or more users select a subset of the top ranked trending topics. The top ranked trending topics may reflect a rough estimate of those topics that are truly trending. The user selection indicates a more reliable indication of which topics are most important to surface for other consumers of the ranked trending topics. Thus, the selected subset of topics may be viewed by other users.

In an embodiment, such feedback is used to adjust the formula used by score generator 226 to generate trending scores. For example, different values of the smoother are tested on a previously-computed ranked set of topics (R) to come up with a different ranking of that set of topics (R') that more closely matches (or exactly matches) the ranking (R") that one or more users gave the previously-computed ranked set (R).

Identify Non-Trending Topics

In an embodiment, topics that used to be trending but are no longer trending are identified. For example, ranker 228 (or another component of system 200) identifies a set of trending topics for a previous time period (e.g., in the last week) and determines whether any of those topics are in a set of trending topics identified for the current time period (e.g., the current week). This is an example of a set difference (A–B). For any such topics, those topics may still be popular (e.g., ten thousand instances of the topic identified this week and ten thousand instances of the topic identified last week), but no significant increase or decrease in popularity. Alternatively, those topics may be becoming less and less popular (e.g., ten thousand instances of the topic identified this week and twenty thousand instances of the topic identified last week).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
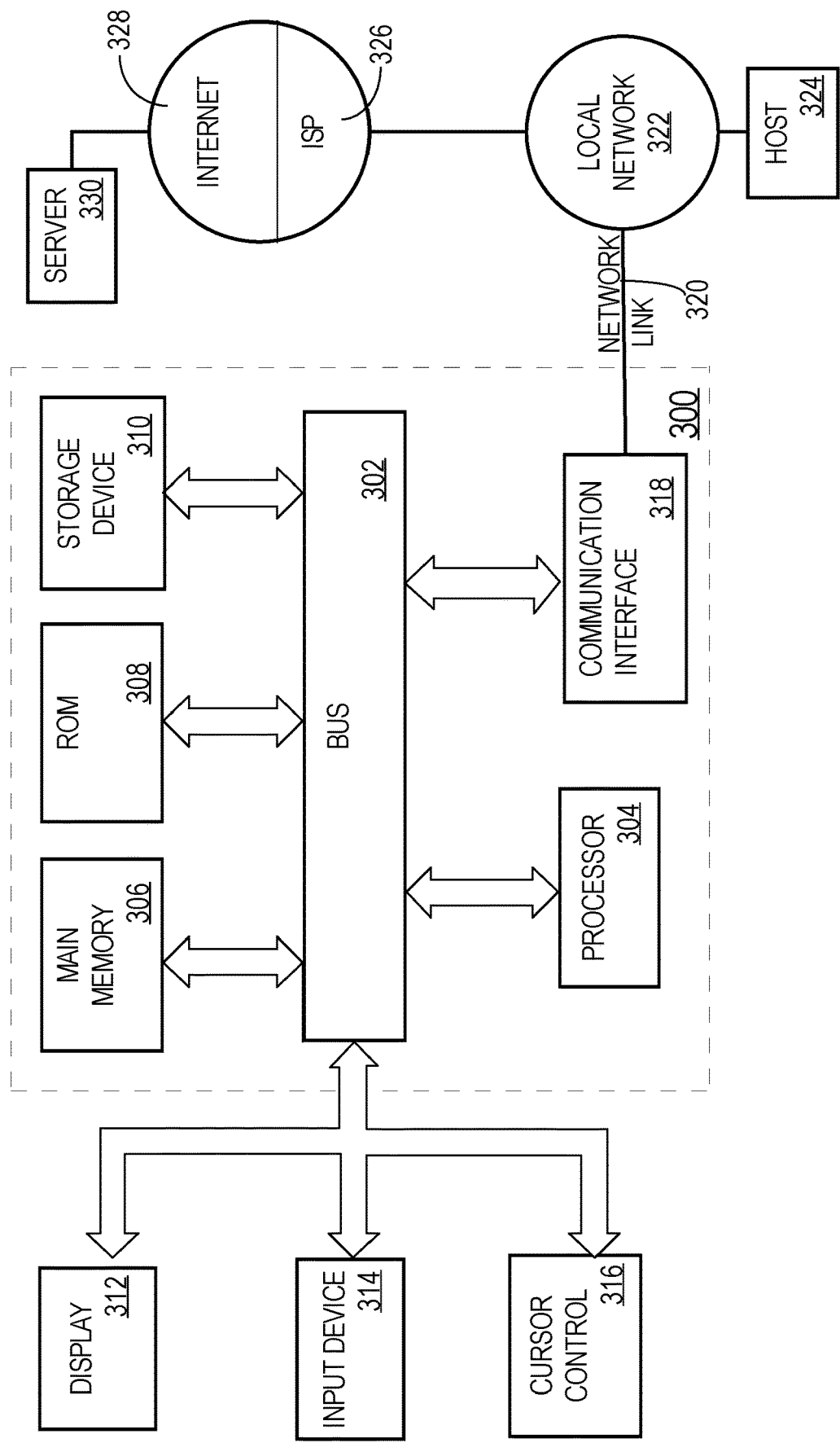
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
 storing, in an electronic data store, a plurality of digital documents;
 accessing the electronic data store to identify a first plurality of topics in the plurality of digital documents;
 determining a co-occurrence of each pair of topics in a plurality of pairs of topics in the first plurality of topics;

based on a deduplication threshold and the co-occurrence of each pair of topics in the plurality of pairs of topics, identifying a strict subset of the plurality of pairs of topics;

based on the strict subset of the plurality of pairs of topics, removing multiple topics from the first plurality of topics to identify a second plurality of topics that includes fewer topics than the first plurality of topics;

for each topic in the second plurality of topics:
  determining one or more frequencies of said each topic, wherein determining the one or more frequencies comprises, for each time period of one or more time periods, determining a frequency of said each topic during said each time period;
  determining a particular frequency of said each topic in a particular time period that is subsequent to the one or more time periods;
  generating a trending score for said each topic based on the one or more frequencies and the particular frequency;

generating a ranking of the second plurality of topics based on the trending score for each topic in the second plurality of topics;

causing the second plurality of topics to be arranged on a screen of a computing device based on the ranking of the second plurality of topics;

wherein the method is performed by one or more computing devices.

2. The method of claim 1, further comprising:
storing a plurality of document corpora, wherein each document corpus of the plurality of document corpora is associated with a different time period of a plurality of time periods that includes the one or more time periods and the particular time period;

for a first document corpus of the plurality of document corpora:
  analyzing the first document corpus to identify a first set of topics, and
  for each topic in the first set of topics, determining a number of instances, in the first document corpus, of said each topic;

for a second document corpus of the plurality of document corpora:
  analyzing the second document corpus to identify a second set of topics, and
  for each topic in the second set of topics, determining a number of instances, in the second document corpus, of said each topic.

3. The method of claim 1, wherein:
the one or more periods are a plurality of periods;
the one or more frequencies are a plurality of frequencies;
each frequency in the plurality of frequencies corresponds to a different period of the plurality of periods;
generating the trending score comprises generating the trending score based on each individual frequency in the plurality of frequencies and the particular frequency.

4. The method of claim 3, wherein:
generating the trending score comprises calculating a difference between the particular frequency and an aggregation of the plurality of frequencies, wherein the aggregation involves computing an average or a median of multiple frequency-related values.

5. The method of claim 4, wherein:
generating the trending score comprises calculating a ratio of the difference and the aggregation.

6. The method of claim 1 wherein generating the trending score comprises:
selecting, based on the one or more frequencies, a smoother coefficient that reduces the sensitivity of a normalized difference between the particular frequency and a past frequency that is based on the one or more frequencies;
generating the trending score based on the smoother coefficient and a difference between the particular frequency and the past frequency.

7. The method of claim 6, wherein generating the trending score comprises:
for a first topic in the plurality of topics:
  determining one or more first frequencies of the first topic;
  determining a first current frequency of the first topic;
  selecting, based on the one or more first frequencies, a first smoother coefficient that reduces the sensitivity of a first normalized difference between the first current frequency and a first past frequency that is based on the one or more first frequencies;
  generating a first trending score based on the first smoother coefficient and a difference between the first current frequency and the first past frequency;
for a second topic, in the plurality of topics, that is different than the first topic:
  determining one or more second frequencies of the second topic;
  determining a second current frequency of the second topic;
  selecting, based on the one or more second frequencies, a second smoother coefficient that is different than the first smoother coefficient that reduces the sensitivity of a second normalized difference between the second current frequency and a second past frequency that is based on the one or more second frequencies;
  generating a second trending score based on the second smoother coefficient and a difference between the second current frequency and the second past frequency.

8. The method of claim 6, further comprising:
determining which topics in the plurality of topics were selected based on user input;
based on the user input, adjusting a smoother function that generates the smoother coefficient.

9. The method of claim 1, wherein determining the co-occurrence of pairs of topics in the first plurality of topics comprises limiting the determining to the same sentence, wherein a pair of topics co-occur only if both topics appear in the same sentence.

10. The method of claim 1, wherein a document in the plurality of digital documents is a blog post, a comment on an online posting, or a tweet.

11. The method of claim 1, further comprising:
for each topic of the first plurality of topics:
  storing, in a second electronic data store, in association with said each topic, (1) a list of document identifiers, each of which identifies a digital document in which said each topic was detected and (2) a list of section identifiers that correspond to the list of document identifiers and identifies a section, of one of the digital documents identified by a document identifier in the list, in which said each topic was detected;
wherein determining the co-occurrence of each pair of topics in the plurality of pairs of topics in the first plurality of topics comprises, for each pair of topics in the plurality of pairs of topics:
  identifying a first document identifier and a first section identifier of a first topic in said each pair of topics;
  identifying a second document identifier and a second section identifier of a second topic in said each pair of topics;
  determining that the first topic and the second topic co-occur in a digital document in response to determining that the first document identifier matches the second document identifier and that the first section identifier matches the second section identifier.

12. A system comprising:
one or more processors;
one or more storage media storing instructions which, when executed by the one or more instructions, cause:
  storing, in a database, a plurality of digital documents;
  accessing the database to identify a first plurality of topics within digital text of the plurality of digital documents;
  determining a co-occurrence of each pair of topics in a plurality of pairs of topics in the first plurality of topics;
  based on a deduplication threshold and the co-occurrence of each pair of topics in the plurality of pairs of topics, identifying a strict subset of the plurality of pairs of topics;
  based on the strict subset of the plurality of pairs of topics, removing multiple topics from the first plurality of topics to identify a second plurality of topics that includes fewer topics than the first plurality of topics;
  for each topic in the second plurality of topics:
    determining one or more frequencies of said each topic, wherein determining the one or more frequencies comprises, for each time period of one or more time periods, determining a frequency of said each topic during said each time period;
    determining a particular frequency of said each topic in a particular time period that is subsequent to the one or more time periods;
    generating a trending score for said each topic based on the one or more frequencies and the particular frequency;
  ranking the second plurality of topics based on the trending score for each topic in the second plurality of topics.

13. The system of claim 12, wherein the instructions, when executed by the one or more processors, further cause:
  storing a plurality of document corpora, wherein each document corpus of the plurality of document corpora is associated with a different time period of a plurality of time periods that includes the one or more time periods and the particular time period;
  for a first document corpus of the plurality of document corpora:
    analyzing the first document corpus to identify a first set of topics, and
    for each topic in the first set of topics, determining a number of instances, in the first document corpus, of said each topic;
  for a second document corpus of the plurality of document corpora:
    analyzing the second document corpus to identify a second set of topics, and
    for each topic in the second set of topics, determining a number of instances, in the second document corpus, of said each topic.

14. The system of claim 12, wherein:
the one or more periods are a plurality of periods;
the one or more frequencies are a plurality of frequencies;
each frequency in the plurality of frequencies corresponds to a different period of the plurality of periods;
generating the trending score comprises generating the trending score based on each individual frequency in the plurality of frequencies and the particular frequency.

15. The system of claim 14, wherein:
generating the trending score comprises calculating a difference between the particular frequency and an aggregation of the plurality of frequencies, wherein the aggregation involves computing an average or a median of multiple frequency-related values.

16. The system of claim 15, wherein:
generating the trending score comprises calculating a ratio of the difference and the aggregation.

17. The system of claim 12, wherein generating the trending score comprises:
  selecting, based on the one or more frequencies, a smoother coefficient that reduces the sensitivity of a normalized difference between the particular frequency and the one or more frequencies;
  generating the trending score based on the smoother coefficient.

18. The system of claim 17, wherein generating the trending score comprises:
  for a first topic in the second plurality of topics:
    determining one or more first frequencies of the first topic;
    determining a first frequency of the first topic;
    selecting, based on the one or more first frequencies, a first smoother coefficient;
    generating a first trending score based on the one or more first frequencies, the first frequency, and the first smoother coefficient;
  for a second topic, in the second plurality of topics, that is different than the first topic:
    determining one or more second frequencies of the second topic;
    determining a second frequency of the second topic;
    selecting, based on the one or more second frequencies, a second smoother coefficient that is different than the first smoother coefficient;
    generating a second trending score based on the one or more second frequencies, the second frequency, and the second smoother coefficient.

19. The system of claim 17, wherein the instructions, when executed by the one or more processors, further cause:
  determining which topics in the second plurality of topics were selected based on user input;
  based on the user input, adjusting a smoother function that generates the smoother coefficient.

20. The system of claim 12, wherein determining the co-occurrence of pairs of topics in the first plurality of topics comprises limiting the determining to the same sentence, wherein a pair of topics co-occur only if both topics appear in the same sentence.

* * * * *